Aug. 12, 1952 H. W. HEINE 2,606,645
APPARATUS FOR CONVEYING PLASTIC BUILDING MATERIALS
Filed Dec. 7, 1949 2 SHEETS—SHEET 1

INVENTOR
Henry W. Heine.
BY
ATTORNEY

Aug. 12, 1952          H. W. HEINE          2,606,645
APPARATUS FOR CONVEYING PLASTIC BUILDING MATERIALS
Filed Dec. 7, 1949          2 SHEETS—SHEET 2
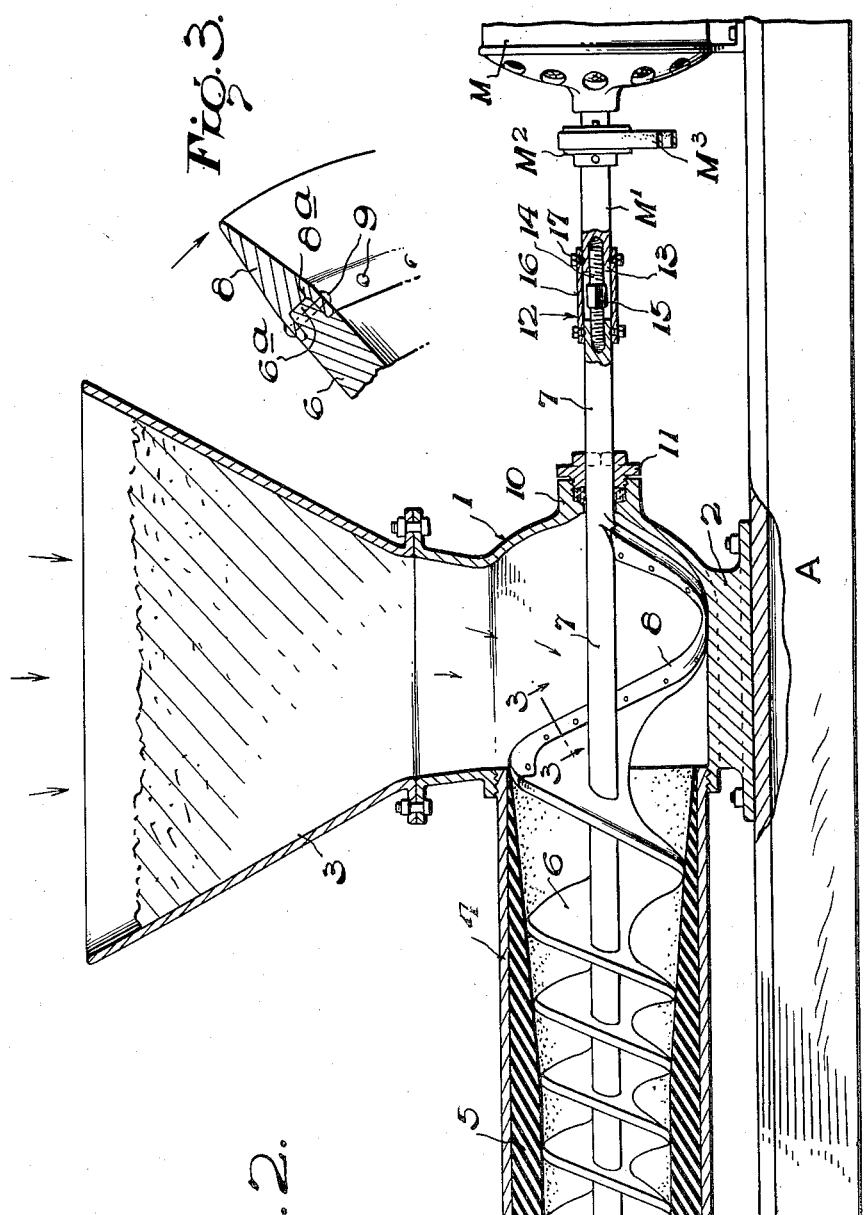
INVENTOR
Henry W. Heine.
BY 
ATTORNEY Patented Aug. 12, 1952

2,606,645

UNITED STATES PATENT OFFICE 2,606,645

APPARATUS FOR CONVEYING PLASTIC BUILDING MATERIALS

Henry William Heine, Washington, D. C.

Application December 7, 1949, Serial No. 131,685

2 Claims. (Cl. 198—64)

This invention relates to portable apparatus for conveying plastic material such as plaster, cement mixtures and the like from a point of supply to the point of use in a building or other structure.

According to conventional practice, plaster, mortar and the like are, in a great majority of cases conveyed by hods, wheel-barrows or the like, with considerable loss of time, and, in any event with the employment of costly man power. Therefore, the present invention has in view apparatus which may be conveniently transported, manipulated, and controlled, for supplying the plastic material from a convenient source of supply to the point of use. In that connection, the invention includes an apparatus adapted to be mounted on a truck or the like of such sizes and proportions that it may be readily moved through doorways and into convenient position for receiving prepared material to be transmitted to the point of use.

One of the objects of the invention is to provide an apparatus of the type referred to including a pump of the screw conveyor type which operates in conjunction with a surrounding lining of rubber housed in the discharge portion of the pump. This arrangement reduces wear on the discharge spout and also aids in maintaining relatively fluid-tight contact between the blades and the interior wall of the spout.

Another object of the invention is to provide the screw conveyor which forms the pump, at its intake end, with an enlarged renewable and replaceable blade portion which will more readily scoop up the material from the hopper and feed it to the pumping portion of the screw.

A further object of the invention is to provide a pump of the screw conveyor type mounted on a shaft which is longitudinally shiftable to enable the screw conveyor to be adjusted for wear relative to the rubber lining of this discharge spout.

A still further object of the invention is to provide an apparatus which is controlled by the operator of the applicator nozzle by simply manipulating a switch which will open and close a circuit to a motor. In that connection the invention contemplates a construction which eliminates clutches that are likely to become fouled or otherwise likely to get out of order.

With the above and other objects in view which will more readily appear as the nature of the invention is better understood, the same consists in the novel construction, combination and arrangement of parts, hereinafter more fully described, illustrated, and claimed.

A preferred and practical embodiment of the invention is shown in the accompanying drawing in which:

Figure 2 is an enlarged detail sectional view of the pump and its operating connections; and Figure 3 is a detail cross sectional view taken on the line 3—3 of Figure 2.

Similar reference characters designate corresponding parts throughout the several figures of the drawings.

Figure 1:
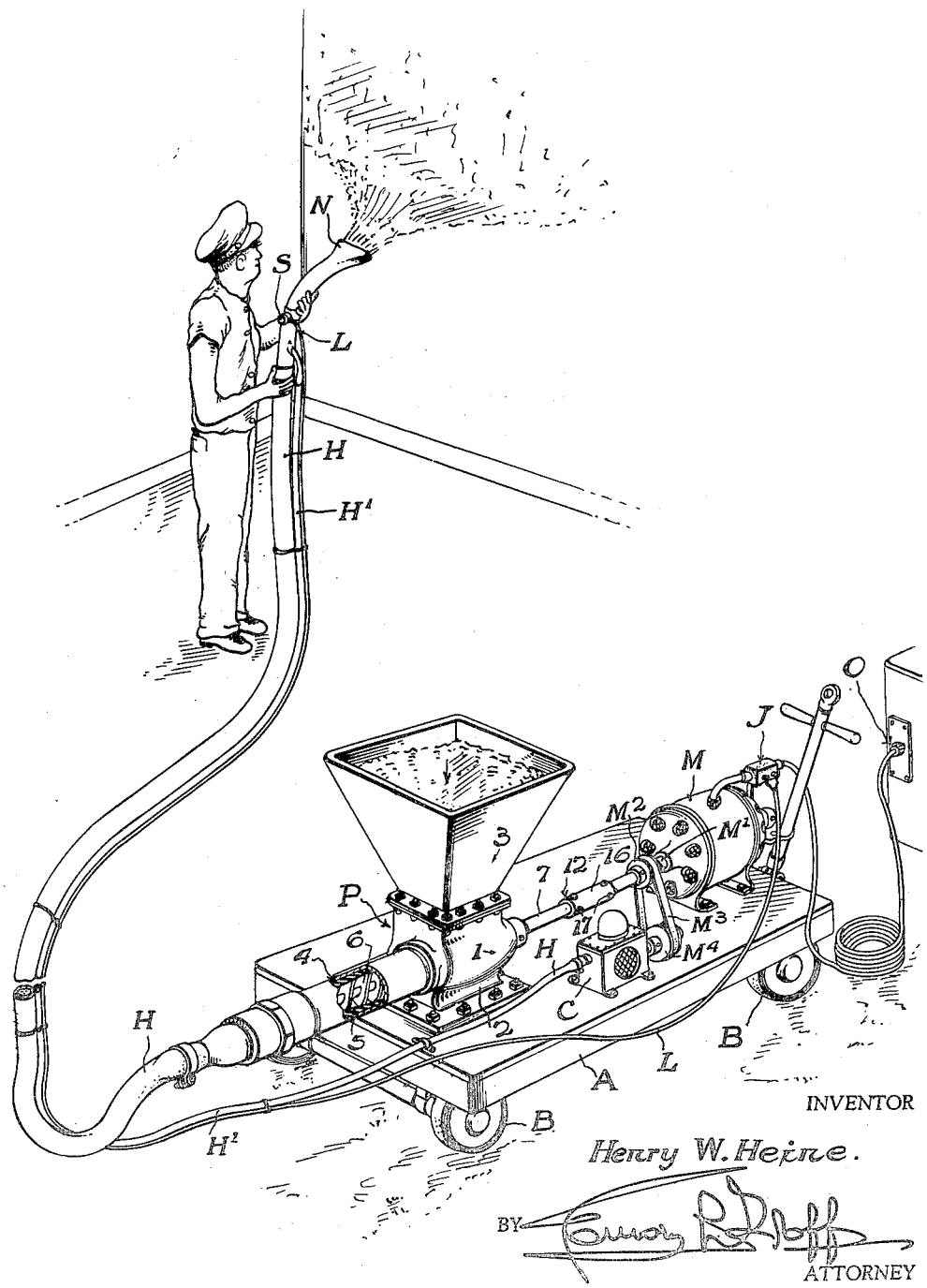
Figure 1 is a perspective view illustrating the application of the invention.

Referring to Figure 1, it will be observed that the apparatus includes a truck or dolly comprising a platform A mounted on suitable casters, rollers, or wheels B so that the same may be readily moved from place to place. The platform A carries a rotary pump designated generally as P driven by an electric motor M adapted to be supplied with current from any standard source of supply such as the outlet O by a conventional extension cord.

The motor M is provided with a shaft $M^1$ which, as will presently appear, operates the pump. It may be also pointed out that the motor shaft $M^1$ is provided with a pulley $M^2$ which drives a belt $M^3$ sheaved over the pulley $M^4$ of an air compressor C which supplies air to the applicator nozzle N under the control of the operator, as will presently appear. Thus, it will be seen that the motor M is intended to control the pump P and compressor C, and the motor itself is in turn under the control of the operator through suitable switch means S on the nozzle N and connected in the line L leading to the junction box J between the motor lead-in and the supply outlet O.

Referring more particularly to the pump P, it will be observed that the same includes a body or bowl portion 1 including a stand or base 2 secured to the platform A. The bowl or body 1 is supplied with premixed plastic material through the hopper 3. The body 1 is provided with an elongated discharge spout 4 whose inner end is screwed or otherwise detachably fitted to the body 1. The opposite end of the discharge spout 4 communicates with a hose H which may be of any desired length and terminates at the applicator nozzle N.

The internal face of the discharge spout 4 is provided with a rubber, plastic, or non-abrasive lining 5 whose inner profile conforms to the profile of the screw. This lining is of maximum thickness at the end of the discharge spout 4 and is of progressively reduced thickness as it approaches the point of connection of the spout 4 with the body 1. The rubber lining 5 cooperates with a helical or screw conveyor 6 whose flights progressively diminish in axial spacing toward the outlet end of the spout to subject the material being handled to increasing pressure sufficient to force the same through the hose H.

The helical flight forming the conveyor screw is carried by a shaft 7 and that portion of the flight within the bowl or body 1 is provided with a renewable blade 8 or fin which may be secured to the screw flight as shown in Figure 3. From this figure, it will be seen that the rear portion of the screw 6 is provided with a tenon edge 6a adapted to fit in the mortice 8a in the base of the blade so that when the parts are assembled as shown in Figure 3 they may be connected by the fastenings 9. The renewable blade 8 operates only in the bowl or body 1 and extends the sides of the screw in the zone of the body 1 so as to more adequately push the material from the hopper 3 into the reduced portion of the flight.

The shaft 7 is mounted at its rear end in any suitable bearing 10 formed on the body 1 and preferably operates in conjunction with a gland nut 11 so that the shaft 7 may slide axially in the bearing and yet material in the hopper will not be squeezed through the bearing.

The shaft 7 of the conveyor flight and the shaft $M^1$ of the motor are connected by adjusting means designated generally as 12. As will be seen from Figure 2, the adjacent ends of the shafts 7 and $M^1$ are provided with threaded sockets 13 for receiving the threaded ends of an adjusting member 14. The threads on said member and the mating threads in the sockets 13 are of opposite pitch so that when the member 14 is rotated by the nut portion 15, the shaft 7 may be drawn toward or from the shaft $M^1$. The purpose of this arrangement, however, is to permit the shaft 7 to be adjusted toward the discharge pipe 4 so as to keep the edges of the screw flight in proper contact with the rubber lining 5. That is to say, the member 14 may be adjusted so as to push the conveyor toward the tapered rubber lining as wear occurs in order to insure the full pumping efficiency of the conveyor.

In order to hold the member 14—15 in locked position the same is covered by a sleeve 16. This sleeve may be secured in fixed position by the fastening screws 17. When it is desired to have access to the adjusting means 14—15, the fastenings 17 are loosened and the sleeve 16 is pushed aside a sufficient distance to expose the nut 15 of the member 14 to a wrench or equivalent tool.

As previously set forth, the discharge pipe 4 communicates with a hose H leading to the discharge nozzle N and is adapted to be manipulated by the operator to control the supply of plastic material to a wall or like surface. The nozzle N is supplied with compressed air through the hose $H^1$ leading from the compressor C, the same being held to the hose H by any suitable ties which also secure the line wire L leading from the switch S on the nozzle N to the junction box J.

Assuming that the hopper 3 is filled with plastic material and the operator holding the nozzle N desires to apply or spread the material on a wall or other surface, the operator manipulates the electric switch S to close the circuit to the motor M which will operate the pump P. The compressor C will also be started and supply compressed air to the nozzle N to assist in the ejection of plastic material from the nozzle. When the switch S is opened by the operator the entire apparatus will stop and the amount of plastic material supplied to the nozzle N will diminish to the stopping point.

From the foregoing it will be seen that the present invention provides a simple and practical form of apparatus for transferring plastic material quickly and in the desired controlled quantities from a source of supply to the point of use. By reason of the motor M being under the control of the operator and the pump and compressor C being driven directly from the motor M, it will be seen that by simply controlling current to the motor M, the entire apparatus will be controlled, and no clutches or the like need be employed in the apparatus.

I claim:

1. In an apparatus for conveying plastic building materials from a point of supply to a point of use, a rotary pump having a feed hopper and a bowl portion in receiving relation thereto, a screw conveyor for the pump having the rear portion of its flight disposed within said bowl portion, a shaft for the screw conveyor journaled in and projecting through the rear wall of the bowl portion and slidable therein, a motor having a drive shaft aligned with said conveyor shaft, the adjacent ends of said shafts having reversely threaded screw sockets, an adjusting member having reversely threaded end portions fitting in the mating socket portions of the shafts and also having an intermediate nut portion adapted for tool engagement, a sleeve normally covering said adjusting means and adapted to be shifted therefrom to expose said nut, and means carried by the sleeve for locking the same to the conveyor shaft and the drive shaft.

2. In an apparatus for conveying plastic building materials from a point of supply to a point of use, a rotary pump having a feed hopper and a bowl portion in receiving relation thereto, a discharge spout communicating with said bowl portion, a rubber lining for said spout, a screw conveyor having the rear portion of its flight disposed in said bowl portion and the forward portion of its flight disposed in said rubber lining and including a shaft journaled in said bowl portion, a motor having a drive shaft aligned with the shaft of the screw conveyor, and means between said drive shaft and the conveyor shaft for adjusting the screw conveyor toward the rubber lining to compensate for relative wear therebetween, said means comprising an expansion member disposed between the conveyor shaft and the drive shaft and including a medial nut, and a hollow sleeve shiftable from a position concealing said nut to a position exposing the same, and means on the sleeve for locking the same to the conveyor shaft and the drive shaft when the sleeve is in telescoping locking position relative to said nut.

HENRY WILLIAM HEINE.

REFERENCES CITED

The following references are of record in the file of this patent:

UNITED STATES PATENTS

| Number | Name | Date |
|---|---|---|
| 19,421 | Helton | Feb. 23, 1858 |
| 292,550 | Fairly | Jan. 29, 1884 |
| 1,005,472 | Renneburg | Oct. 10, 1911 |
| 2,201,736 | McGrew | May 21, 1940 |
| 2,418,540 | Bressler | Apr. 8, 1947 |
| 2,419,410 | Maurer | Apr. 22, 1947 |
| 2,428,995 | Rogers | Oct. 14, 1947 |
| 2,556,392 | Hawk | June 12, 1951 |

FOREIGN PATENTS

| Number | Country | Date |
|---|---|---|
| 311,207 | Germany | Mar. 30, 1917 |